Feb. 28, 1967  R. FERWERDA  3,306,175
TRUCK DRIVEN COMPACTION ROLLER DEVICE
Filed June 23, 1964  3 Sheets-Sheet 1

INVENTOR.
RAY FERWERDA
BY
Meyer, Baldwin, Doran & Egan
ATTORNEYS

Feb. 28, 1967     R. FERWERDA     3,306,175
TRUCK DRIVEN COMPACTION ROLLER DEVICE
Filed June 23, 1964     3 Sheets-Sheet 3

INVENTOR.
RAY FERWERDA
BY
Meyer, Baldwin, Doran & Egan
ATTORNEYS

United States Patent Office 3,306,175
Patented Feb. 28, 1967

3,306,175
TRUCK DRIVEN COMPACTION ROLLER DEVICE
Ray Ferwerda, 1050 NW. 163rd Drive,
North Miami, Fla. 33160
Filed June 23, 1964, Ser. No. 377,198
8 Claims. (Cl. 94—50)

This invention relates to a truck driven compaction roller device and more particularly to improvements in a soil compaction roller device driven by and weighted down by known ordinary wheeled vehicles such as a highway truck.

The invention provides a soil compacting roller device upon which a wheeled truck is adapted to be driven and positioned in place with the drive wheels of the truck in position to drivingly rotate some of the soil compaction rollers so as to cause the device to travel over the ground and compact the soil. At the same time, steerable wheels of the truck may be attached to steerable portions of the soil compaction roller device so that the entire arrangement can be steered as desired while compacting soil.

Other objects and advantages of the invention will be apparent from the accompanying drawings and description and the essential features thereof will be set forth in the appended claims.

In the drawings,

FIG. 6 is a fragmental sectional view, enlarged, taken along the line 6—6 of FIG. 2; while

Figure 1:
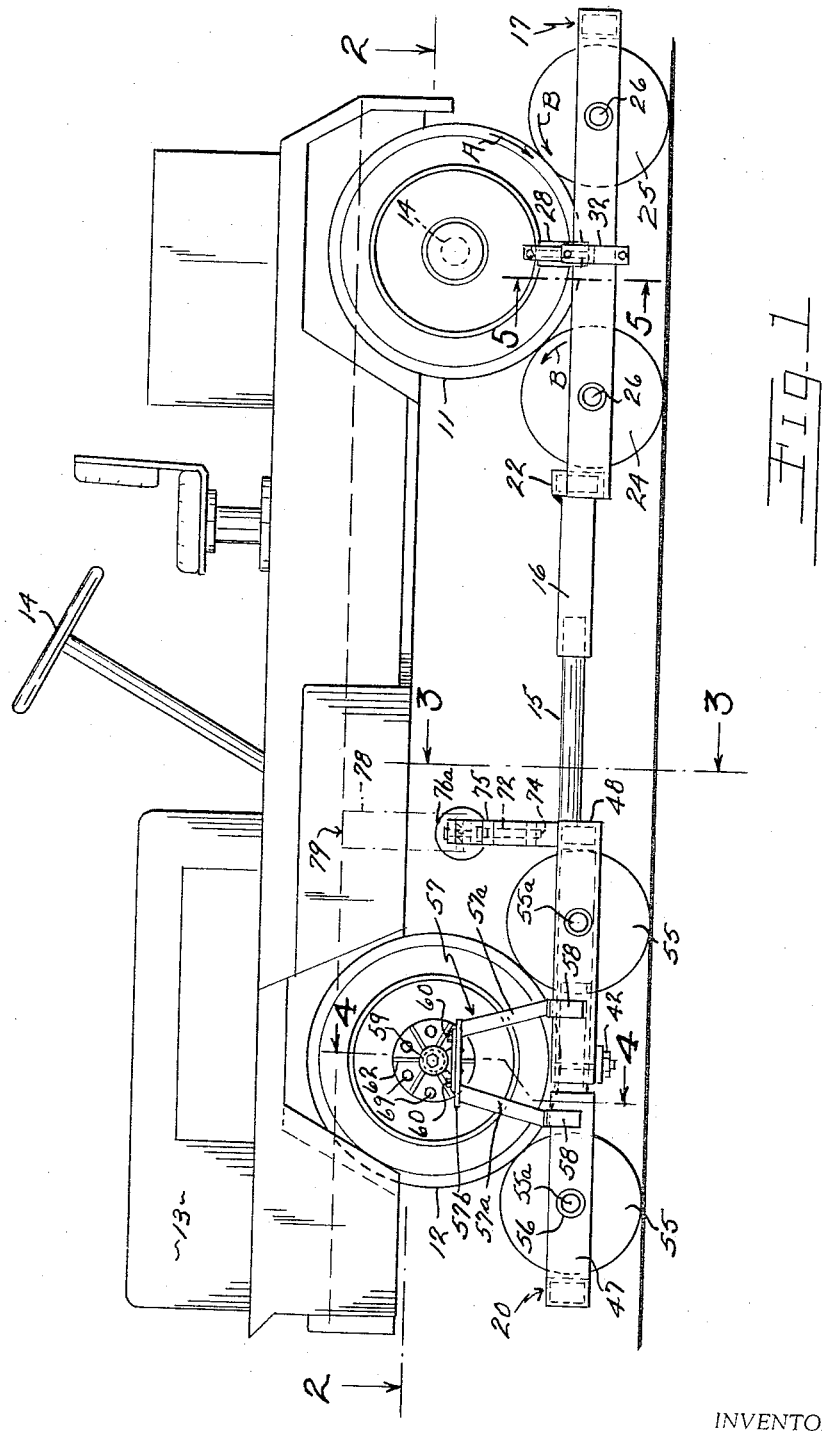
FIG. 1 is a side elevational view of the compaction roller device with a truck mounted thereon in such position that it may be utilized to drive the roller compaction device while providing the major portion of the weight for soil compaction and also the device may be steered by the means indicated at the front wheels of the truck.

Specialized soil compaction roller devices are usually big, heavy and expensive pieces of equipment and cause a contractor unnecessarily to expend equipment capital in situations where soil compaction is a minor portion of the job. To take care of such a situation the present invention provides a rather simple soil compaction roller device which can be driven by an ordinary highway type of truck vehicle while the vehicle adds much of the weight necessary in the soil compaction device. In FIG. 1 I have shown an ordinary truck vehicle 10 having rear drive wheels 11 and steerable front wheels 12. The usual motor vehicle engine is housed under the hood 13 of the truck and connected by a usual drive shaft assembly to the rear axle 14 so as to drive the rear wheels 11. As clearly seen in FIG. 2, there is a pair of rear drive wheels 11 on each side of the vehicle but this in itself forms no part of the present invention as any driven truck wheel may be utilized with this invention. The front wheels 12 are steered in the usual manner by means of a steering wheel 14 but since this customary steering of the highway vehicle is of no great importance in the present invention, no details of such steering device are necessary here, the same being well known. The front wheels 12 are connected in the truck frame by steering knuckles in the usual manner so as to render the wheels 12 steerable but such structure is old and well known and is not shown in the present drawings which are limited to the novel parts of the improved compaction roller device.

Figure 2:
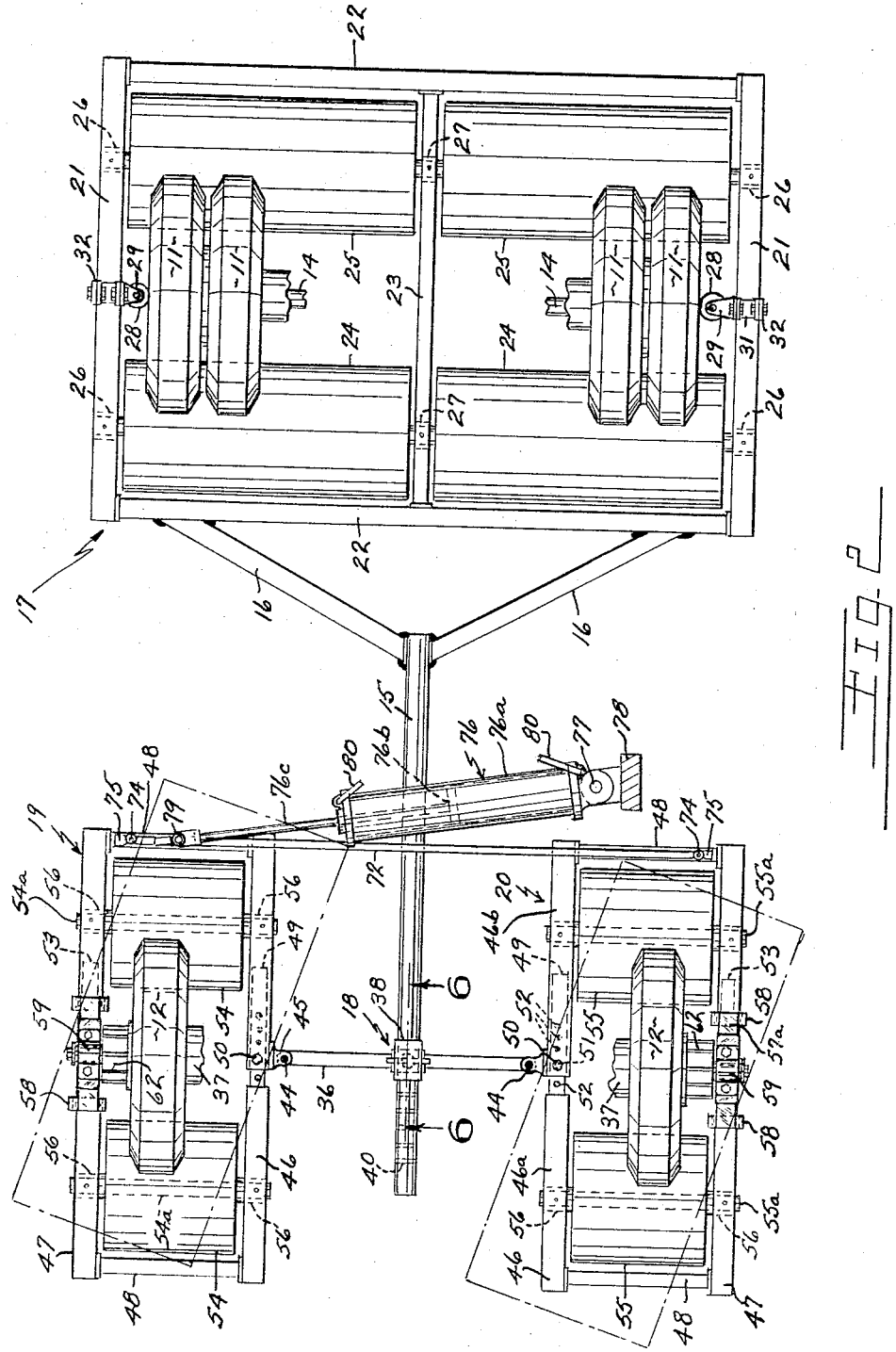
FIG. 2 is a top plan view of the roller compaction device taken along the line 2—2 of FIG. 1, leaving out practically all of the truck for a clear understanding of this invention.

Such compaction roller device is probably best understood from FIG. 2. Said device includes a main frame 15 having means 16 at the rear end thereof for rigidly connecting a first subframe 17 and having means 18 near the front end of the main frame for connecting second and third subframes 19 and 20 respectively.

Figure 5:
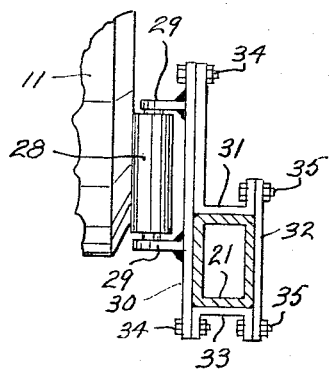
FIG. 5 is a fragmental sectional view, enlarged, taken along the line 5—5 of FIG. 1.

This subframe comprises parallel side members 21 extending longitudinally of the vehicle rigidly connected to cross members 22 extending crosswise of the vehicle so as to form generally a rectangle. Centrally of this frame, and parallel to the side members 21, is a dividing frame member 23 rigidly connected between the cross members 22. A pair of soil compaction roller means 24, 25 are rotatably mounted in the subframe 17 in bearings 26 carried by the side frame members 21 and bearings 27 carried by the dividing frame member 23. Each of the roller means 24 and 25 is divided centrally of the machine so as to allow different rates of rotation of the roller means on the left and right-hand sides respectively of the device as the vehicle travels around a curve. Some means is desirable for holding the truck wheels 11 in proper position on said frame 17. One such means is shown in FIGS. 2 and 5 as comprising friction reducing means represented by rollers 28 supported for rotation about vertical axes in bearing brackets 29 which in turn are rigidly secured to a plate 30 to which is bolted a three-part box forming means 31, 32, 33 adapted to embrace and tightly clamp the side frame member 21 as shown in FIG. 5 when the bolts 34 and 35 are tightened. This arrangement permits adjustment of the rollers 28 longitudinally of the vehicle by sliding the clamp shown in FIG. 5 longitudinally of the side frame members 21.

Figure 3:
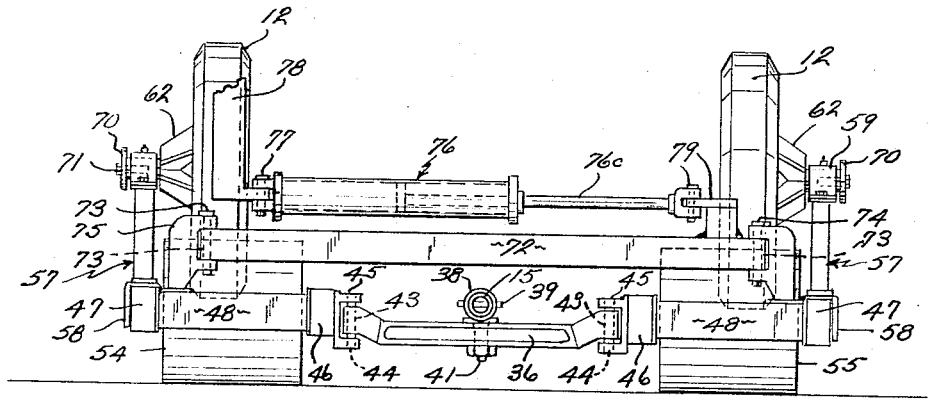
FIG. 3 is a fragmental sectional view taken along the line 3—3 of FIG. 1.
Figure 6:
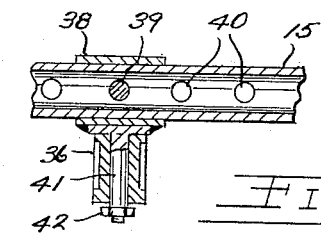

The means 18 at the front end of the main frame 15 for connecting thereto the subframes 19 and 20 comprises an axle 36 extending crosswise of the vehicle and approximately in line with the front axle 37 of the vehicle which supports the front wheels 12. The connection between the members 15 and 36 is clearly shown in FIG. 6. A sleeve 38 embraces the tubular member 15 and is held in position by a pin 39 passing through aligned openings in sleeve 38 and openings 40 in the member 15. A plurality of these openings 40 are provided so that the sleeve 38 may be moved to various adjusted positions along the tubular member 15 depending upon the wheel base of the truck being used in this invention. Rigid with the sleeve 38 and depending downwardly therefrom is a pin 41 which passes through a suitable opening in the axle 36 and is held assembled by a nut 42. As clearly seen in FIGS. 2 and 3, at its opposite ends, the axle 36 is provided with integral eyes 43, each of which is connected by a vertical pin 44 with a clevis 45 which is rigidly mounted on a side member 46 of one of the subframes 19 or 20. Each of these second and third subframes 19 and 20 is provided with parallel outside frame member 47 and these in turn are rigidly connected with the side frame members 46 by cross frame members 48 at the front and rear respectively of each subframe.

Figure 4:
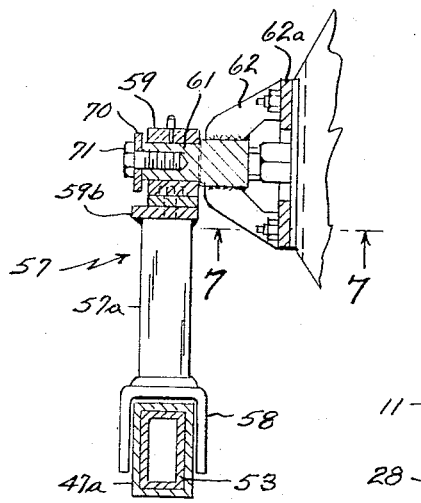
FIG. 4 is a fragmental sectional view, enlarged, taken along the line 4—4 of FIG. 1.

Different size subframes could be provided for each individual case, but to give the device flexibility, the frame members 46 and 47 are made adjustable longitudinally by means shown in FIGS. 2 and 4. Welded to the forward portion 46a of each of the side members 46 is an internal box beam 49 which snugly fits in the box beam section of the portion 46a. This box beam 49 extends slidably into the rear portion 46b of each side frame member 46 as indicated in broken lines in FIG. 2. A bolt 50 passes through aligned openings 51 in the top and bottom walls of the member 46b and through a selected opening 52 in the member 49. A similar length adjustment is built into each of the side frame members 47 by welding a member 53, like member 49, to the forward portion of the side frame member 47 and extending it slidingly into the rearward portion of the side frame member 47 and holding the same in position with a pin (not shown). Thus, the length of the subframe members 19 and 20 in the longitudinal direction may be adjusted according to the front truck wheels 12 and the compaction rollers about to be described.

A pair of soil compaction rollers means 54 and 55 is rotatably mounted respectively in the subframe members 19 and 20. The mounting shafts 54a and 55a respectively of these compaction roller pairs are mounted in bearings 56 carried by the side frame members 46 and 47 of the respective subframes.

Note in FIG. 1 that the roller means 24 and 25 of the first subframe 17 and the roller means 55 of the second and third subframes 19 and 20 are so spaced that the peripheries of each roller means respectively will support a truck wheel 11 or 12 between them at a level above a surface G supporting the compaction roller means.

Figure 7:
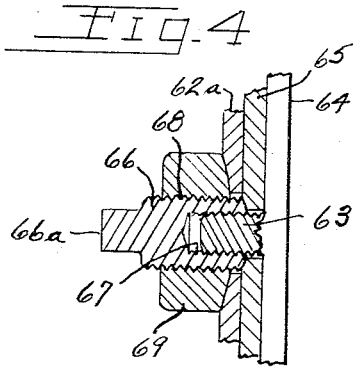
FIG. 7 is a fragmental sectional view, enlarged, taken along the line 7—7 of FIG. 4.

Means is provided for connecting the hubs of the steerable truck wheels 12 respectively to each of the subframes 19 and 20. This means is the same on each side of the vehicle and therefore one only will be described. Referring to FIGS. 1 through 4, and especially to FIG. 4, a rigid, generally inverted U shape bracket 57 has front and rear legs 57a extending downwardly and ending in U shape shoes 58, open downwardly slightly loosely engaging the side frame members 47 so that they are self-adjustable therealong in use of the device as will later appear. Rigidly connected to the top cross member 57b of each bracket 57 is a bearing 59 shown as held in place by the bolts 60. Rotatable in each bearing 59 is a stub shaft 61 to which is rigidly connected as by welding a fixture 62 which in the present instance is shown as an open spider although other constructions might be used. This fixture is recessed toward the wheel 12 so as to straddle the hub of that wheel. It terminates in a flat circular member 62a as clearly seen in FIGS. 4 and 7, which serves as a means for securing the fixture 62 to the wheel 12.

Preferably, but not necessarily, the member 62 is fastened to the wheel using the standard wheel bolts 63 as a basis for securing the same. These wheel bolts in the usual fashion are integral with a wheel disk 64 to which the central wheel portion 65 is normally secured by passing suitable openings in the member 65 over the bolts 63 and then threading down nuts on the studs 63. The modification provided by this invention is a combined nut and stud 66 for each wheel bolt 63 which has an internal thread 67 adapted to be threaded on the stud 63 so as to hold the member 65 tightly against the member 64. The member 66 also has an external thread 68 to which is secured a nut 69 after suitable openings in the member 62a have been passed over the member 66. The outer end of each member 66 as indicated at 66a is non-circular in section which serves to receive a wrench when tightening the member 66 on the stud 63.

Referring back to FIG. 4, the parts 61 and 62 are held assembled in the bearing 59 by means of a washer 70 secured to the outer end of a stub shaft 61 by means of a bolt 71. Note that there is a slight clearance between the washer 70 and the bearing 59 as some movement occurs at this point in use of the device.

Means is provided for turning the second and third subframe means 19 and 20 in unison about their vertical pivotal mountings 44. This comprises a tie rod 72 best seen in FIGS. 2 and 3. This is a very sturdy bar provided with an integral eye 73 at each end through which passes a pin 74 to pivotally connect bar 72 with a heavy clevis bracket 75 at each end, these brackets being secured, as by welding, rigidly to the rear cross frame member 48 of the subframes 19 and 20 respectively.

Power means is provided for turning the subframes 19 and 20 about their pivots 44 for steering the compaction roller device. For this purpose I have provided in this embodiment an hydraulic cylinder and piston motor 76 having a cylinder 76a pivotally mounted at 77 on a bracket 78 which is rigidly welded to the truck frame at 79. A piston 76b is reciprocatable in the cylinder 76a and is connected by a piston rod 76c which in turn has a pivotal connection at 79 with the tie bar 72. Conduit means is shown at 80 for introducing an hydraulic fluid into one end of cylinder 76a while exhausting the same from the other end thereof. This is accomplished by control means of standard character which is not shown herein as such is well known in the art. The operator may control the angular position of the subframes 19 and 20 as desired. For instance, by introducing hydraulic fluid under pressure at the upper connection 80 in FIG. 2 while discharging the same from the lower connection 80, the tie bar 72 may be caused to move in a downward direction as viewed in the drawing so as to move the subframes 19 and 20 from the full line position to the dot-dash position. Obviously, by reversing the flow of hydraulic fluid in the device 76, the subframes 19 and 20 may be moved to the opposite angular position causing the subframes 19 and 20 to turn in a counterclockwise direction about their pivotal mountings 44.

In operation of this device, with the pivot pin 79 disconnected and with the compaction roller device as shown in FIG. 2 resting upon the ground G, planks or structural beams are extended from the ground at the rear of the compaction roller device to the tops of the roller means 25 forwardly therefrom across the roller means 24 and resting upon the compaction roller means 54 and 55 of the forward subframes. The truck 10 under its own power is then run up these planks or structural members until it assumes the position shown in FIG. 1. The planks or structural members, upon which the wheels 11 and 12 have rolled, are then removed, the pivot connection at 79 is established and the front hub fixtures 62 are connected to the front wheels 12 by the means indicated in FIG. 7. Then, to drive the compaction roller device in a forward direction or toward the left as viewed in FIG. 1, the engine 13 is caused to drive the rear shaft 14 in a direction to turn the wheels 11 in the reverse drive direction indicated at A in FIG. 1. This will cause the compaction rollers 24 and 25 to turn in the direction indicated by the arrows B in FIG. 1 by the frictional contact between the rubber tires of the wheels 11 and the surfaces of the rollers 24 and 25. This will push the main frame 15 forwardly causing the front compaction roller means 54 and 55 to also roll in a forward direction, the front wheels 12 turning idly at this time. To reverse the travel of the compaction roller device, the truck engine is caused to be placed in a forward drive position which will turn the drive wheels 11 in the direction opposite to arrow A, thus turning the rollers 24 and 25 in the opposite direction to the arrows B and causing backward travel of the device. Steering of the device is accomplished by means of the power means 76 previously described and the turning of the subframes 19 and 20 angularly about their pivots 44 will cause the front wheels 12 to idly follow in the same direction because of the hub cap mountings in fixtures 62 and cradled in the bearings 59. Such steering action will cause some shifting of the shoes 58 of bracket 57 longitudinally along their associated subframes. Upon completion of a compaction rolling job using this device, the truck 10 is dismounted from the compaction roller device by simply reversing the operations described for mounting the truck on the device.

Wherever in the specification and claims the phrases "truck driven" or "driven truck wheel" occur, I intend them to mean a vehicle the wheels of which are equipped with rubber tires or other peripheral structure by which power driven wheels of the vehicle may frictionally drive the compaction rollers of this invention.

What is claimed is:

1. A soil compacting device adapted to be directly driven by the wheels of a truck supported directly thereupon, said device comprising a main frame member, a first subframe means connected at one end of said main frame member, a pair of soil compaction roller means rotatably mounted in said first subframe means on parallel axes so spaced that the peripheries of said roller means will support a truck wheel between them at a level above a surface supporting said roller means, axle means pivotally connected near the other end of said main frame member on a vertical axis, second and third subframe means respectively at opposite ends of said axle means, generally vertical pivotal mountings connecting said second and third subframe means to said axle means, a pair of soil compaction roller means rotatably mounted in each of said second and third subframe means on parallel axes so spaced that the peripheries of said last named roller means will support a steerable truck wheel between them at a level above a surface supporting the associated roller means, means for connecting the hubs of a pair of steerable truck wheels respectively at each of said last named subframe means, and means for turning said second and third subframe means in unison about their vertical pivotal mountings.

2. A soil compacting device as defined in claim 1 wherein said last named means comprises a bracket upstanding from each of said second and third subframe means and adapted to rotatably support the hub of a disk for attachment to a steerable truck wheel, and each said bracket mounted on its associated subframe means for slight movement relative thereto at right angles to said hub axis.

3. A soil compacting device as defined in claim 1 wherein each said roller means on said first subframe is divided at an intermediate zone for independent rotation of its opposite ends.

4. The combination of claim 1 wherein said last named means is a power means, and a tie rod is pivotally connected at its opposite ends with said second and third subframe means.

5. The combination of claim 1 wherein said means for connecting the hubs of steerable truck wheels to said second and third subframe means includes a bracket on each of said last named subframe means and movable thereon in a fore-and-aft direction.

6. The combination of claim 5 including a fixture for each wheel having means for securement to the wheel bolts of a truck wheel, a stub shaft carried by each fixture in alignment with the associated wheel axis of rotation, and a bearing for each stub shaft fixed to its associated bracket.

7. The combination of claim 1 including a pair of friction reducing means mounted on said first subframe in positions to engage against opposite sides of truck wheels supported on the roller means of said first subframe.

8. A soil compacting device adapted to travel in a path and comprising a frame, at least two pairs of soil compaction roller means rotatably mounted in said frame on parallel axes with rigid means holding one pair spaced ahead of the other pair, each pair being spaced apart in the direction of said path sufficiently to support respectively front and rear truck wheels between and resting upon them, said pair of roller means adapted to support the front wheels of said truck being separated on subframes to support each front wheel independently, means for steering said subframes in unison, a truck having front and rear wheels at least one of which is a driven wheel with drive means therefor, and said truck positioned on said roller means with said driven wheel supported on one pair of said spaced roller means, whereby driving action of said driven wheel will cause said roller means to roll along said path.

References Cited by the Examiner

UNITED STATES PATENTS

| 1,301,294 | 4/1919 | Morris | 189—1.2 |
| 2,259,399 | 10/1941 | Sutter | 214—334 |
| 2,510,817 | 6/1950 | Greiner | 94—50 |

FOREIGN PATENTS 562,316  6/1944  Great Britain.

JACOB L. NACKENOFF, *Primary Examiner.*